US011328539B2

(12) United States Patent
Kugler et al.

(10) Patent No.: US 11,328,539 B2
(45) Date of Patent: May 10, 2022

(54) SYSTEM AND METHOD FOR DEMONSTRATING PROOF OF CONTROL OF AGRICULTURAL MACHINERY

(71) Applicant: AGCO International GmbH, Neuhausen (CH)

(72) Inventors: Martin Kugler, Marktoberdorf (DE); Marc Lindemann, Marktoberdorf (DE); Stefan Reckow, Neuried (DE); Marcus Meirose, Marktoberdorf (DE); Samuel Ullrich, Frankenried (DE)

(73) Assignee: AGCO International GmbH, Neuhausen (CH)

( * ) Notice: Subject to any disclaimer, the term of this patent is extended or adjusted under 35 U.S.C. 154(b) by 200 days.

(21) Appl. No.: 16/743,074

(22) Filed: Jan. 15, 2020

(65) Prior Publication Data

US 2020/0226854 A1    Jul. 16, 2020

Related U.S. Application Data

(60) Provisional application No. 62/792,912, filed on Jan. 16, 2019.

(51) Int. Cl.
*G07C 5/00* (2006.01)
*G05D 1/00* (2006.01)
*G07C 5/08* (2006.01)

(52) U.S. Cl.
CPC ............ *G07C 5/008* (2013.01); *G05D 1/0016* (2013.01); *G05D 1/0022* (2013.01); *G07C 5/08* (2013.01); *G05D 2201/0201* (2013.01)

(58) Field of Classification Search
CPC ........ G07C 5/008; G07C 5/08; G05D 1/0016; G05D 1/0022; G05D 2201/0201;

(Continued)

(56) References Cited

U.S. PATENT DOCUMENTS 9,152,938 B2 * 10/2015 Lang .................... A01B 79/005
2012/0065834 A1 * 3/2012 Senart .................... G07C 5/008
701/31.4

(Continued)

FOREIGN PATENT DOCUMENTS

WO    2019/123661 A1    6/2019

OTHER PUBLICATIONS

European Patent Office, Search Report prepared for related European Application No. EP 19220249.7, dated Apr. 21, 2020.

*Primary Examiner* — Muhammad Shafi (57) ABSTRACT

A system comprises a mobile electronic device and a computer server for demonstrating proof of control of an agricultural machine by a user. The agricultural machine is configured to generate and transmit operational data corresponding to operations of the agricultural machine. The mobile electronic device is configured to receive an identity confirmation action sequence for the user to perform in the agricultural machine. The computer server includes a processing element configured or programmed to receive a request to execute a demonstration of proof of control process, generate and transmit an identity confirmation action sequence to a mobile electronic device associated with the user, transmit an instruction to the agricultural machine to activate logging and transmission of its initial state and operational data, receive operational data related to the identity confirmation action sequence from the agricultural machine, and compare the operational data with the identity confirmation action sequence.

5 Claims, 5 Drawing Sheets

(58) Field of Classification Search
CPC ................ G06Q 50/02; G06Q 30/0645; B60R 2325/205; B60R 2325/308; B60R 25/2018; G06F 21/30
USPC .......................................................... 701/2
See application file for complete search history.

(56) References Cited

U.S. PATENT DOCUMENTS

| | | | |
|---|---|---|---|
| 2015/0052591 A1* | 2/2015 | Miura | A01B 79/005 726/4 |
| 2017/0300219 A1* | 10/2017 | Buchner | G06F 3/04847 |
| 2018/0290628 A1 | 10/2018 | Luke et al. | |
| 2018/0321683 A1* | 11/2018 | Foster | G06N 20/00 |

* cited by examiner

SYSTEM AND METHOD FOR DEMONSTRATING PROOF OF CONTROL OF AGRICULTURAL MACHINERY

RELATED APPLICATION

The current patent application is a non-provisional patent application which claims priority benefit to U.S. Provisional Application No. 62/792,912, entitled "METHOD FOR PROOF OF CONTROL OVER A DATA SOURCE IN CONNECTED SYSTEMS", filed Jan. 16, 2019. The provisional application is hereby incorporated by reference, in its entirety, into the current patent application.

FIELD OF THE INVENTION

Embodiments of the current invention relate to systems and methods for demonstrating a particular individual is operating a particular piece of agricultural machinery.

DESCRIPTION OF THE RELATED ART

Modern self-propelled agricultural machinery, such as tractors, harvesters, etc., typically include sensors and monitors that track and log data regarding the operation of the agricultural machine. The data may include geolocation (that can be used to form a route or track of an agricultural machine's movement), power takeoff rotational speed, rear draft force, and the like, which are recorded periodically along with a timestamp and a machine identification code. Agricultural machinery manufacturers or others provide accounts which store agricultural machinery operational data on a server system for individuals who operate the machines. The server system not only receives operational data from an agricultural machine, but also provides analysis of the data which the agricultural machine operator can view.

In order to have the operational data stored in the proper account and be able to view it, an agricultural machine operator must provide proof of ownership or rentership, such as a vehicle registration document along with an identification card, to a third party with authorized access to the server system. The third party may verify the validity of the documents and then assign data transmitted from the agricultural machine to the agricultural machine operator's account. This authentication process requires considerable time and organizational investment from all parties involved. Often, agricultural machinery dealerships cannot assign resources to these kind of tasks during peak times (e.g., during harvest season) which leads to delays in the authentication process of several weeks or even months. These delays present a problem for the agricultural machine operator because he often wants to use the agricultural machine very soon after acquiring it. Additionally, in multi-user environments (like rental offices, machinery rings, or cooperatives) the relevant ownership documents are often not accessible immediately.

SUMMARY OF THE INVENTION

Embodiments of the current invention solve the above-mentioned problems and provide a system that allows a user to demonstrate proof of control of agricultural machinery without the involvement of a third party. The system may be used with any agricultural machine and comprises a mobile electronic device and a computer server. The agricultural machine generates and transmits operational data corresponding to operations performed by the agricultural machine. The mobile electronic device receives an identity confirmation action sequence for the user to perform in the agricultural machine. The computer server includes a processing element in electronic communication with a memory element. The processing element is configured or programmed to receive a request to execute a demonstration of proof of control process, generate and transmit an identity confirmation action sequence to a mobile electronic device associated with the user, transmit an instruction to the agricultural machine to activate logging and transmission of its initial state and operational data, receive operational data related to the identity confirmation action sequence from the agricultural machine, and compare the operational data with the identity confirmation action sequence. The processing element is further configured or programmed to assign operational data from the agricultural machine to a data account of the user if the operational data matches the identity confirmation action sequence, and transmit a message to the mobile electronic device that instructs the user to perform the identity action sequence again if the operational data does not match the identity confirmation action sequence. The identity confirmation action sequence includes a plurality of randomly-selected or randomly-ordered actions to be performed in the agricultural machine. The agricultural machine comprises a combination of an agricultural vehicle and an agricultural implement, and the operational data comprises data from the agricultural implement. The operational data also comprises data indicating an operation outside of the agricultural vehicle.

Another embodiment of the current invention provides a method for demonstrating proof of control of an agricultural machine by a user. The method comprises receiving a request to execute a demonstration of proof of control process, generating and transmit an identity confirmation action sequence to a mobile electronic device associated with the user, transmitting an instruction to the agricultural machine to activate logging and transmission of its initial state and operational data, receiving operational data related to the identity confirmation action sequence from the agricultural machine, and comparing the operational data with the identity confirmation action sequence. The method further comprises assigning operational data from the agricultural machine to a data account of the user if the operational data matches the identity confirmation action sequence, and transmitting a message to the mobile electronic device that instructs the user to perform the identity action sequence again if the operational data does not match the identity confirmation action sequence. The identity confirmation action sequence includes a plurality of randomly-selected or randomly-ordered actions to be performed in the agricultural machine. The agricultural machine comprises an agricultural vehicle and an agricultural implement, and the identity confirmation action sequence includes at least a randomly-selected or randomly-ordered action to be performed with the agricultural implement outside of the agricultural vehicle. The operational data comprises data from the agricultural implement and data indicating an operation outside of the agricultural vehicle.

Yet another embodiment of the current invention provides a method for demonstrating proof of control of an agricultural machine by a user. The method comprises receiving a request to execute a demonstration of proof of control process, receiving an identity confirmation action sequence from a mobile electronic device associated with the user, transmitting an instruction to the agricultural machine to activate logging and transmission of its initial state and operational data, receiving operational data related to the identity confirmation action sequence from the agricultural machine, and comparing the operational data with the identity confirmation action sequence. The method further comprises assigning operational data from the agricultural machine to a data account of the user if the operational data matches the identity confirmation action sequence, and transmitting a message to the mobile electronic device that instructs the user to perform the identity action sequence again if the operational data does not match the identity confirmation action sequence. The agricultural machine comprises an agricultural vehicle and an agricultural implement, and the identity confirmation action sequence includes at least a randomly-selected or randomly-ordered action to be performed with the agricultural implement outside of the agricultural vehicle. The operational data comprises data from the agricultural implement and data indicating an operation outside of the agricultural vehicle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Figure 1:
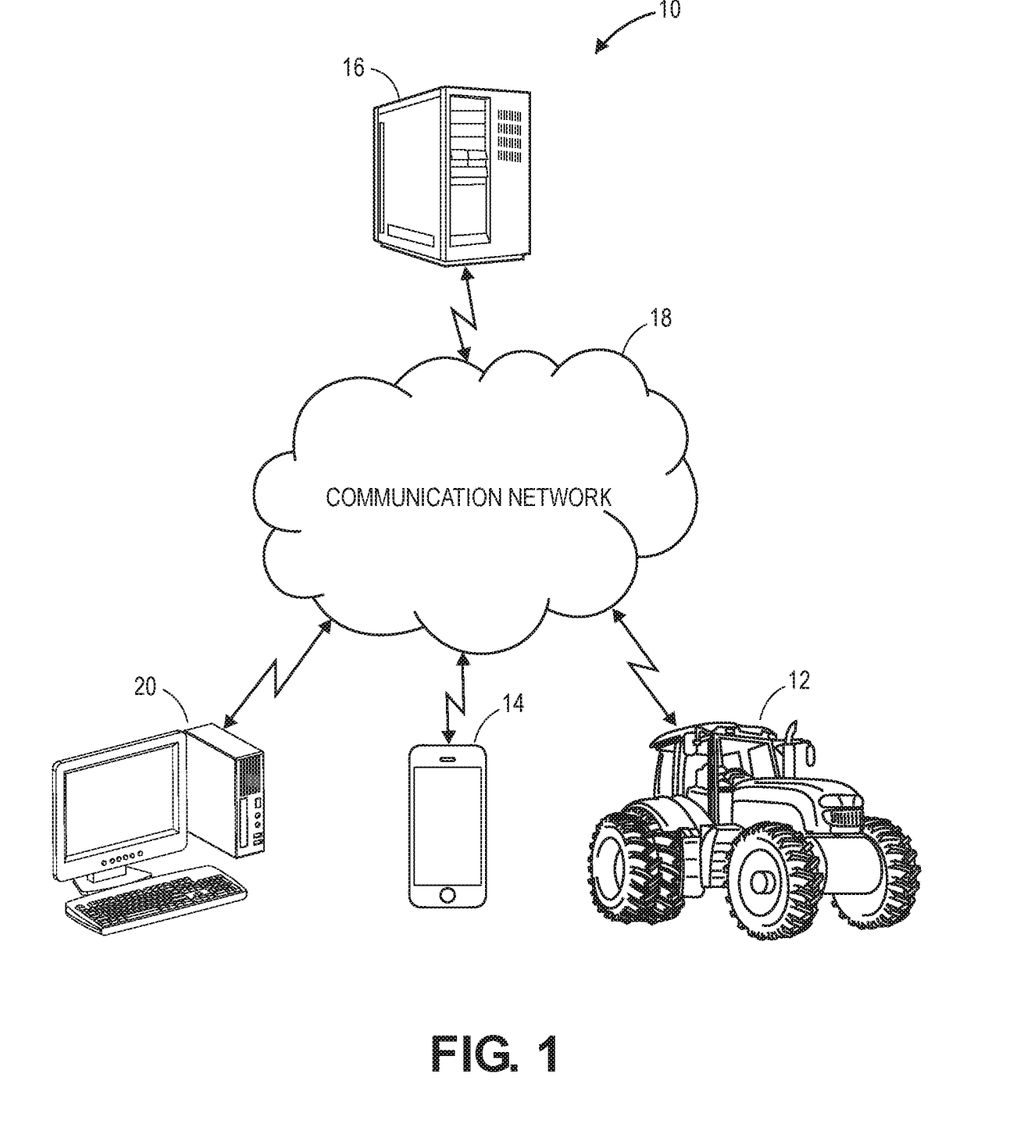
FIG. 1 is an environmental view of a system, constructed in accordance with various embodiments of the current invention, for demonstrating proof of control of agricultural machinery.

A system 10, constructed in accordance with various embodiments of the current invention, for demonstrating proof of control of agricultural machinery is shown in FIG. 1. The system 10 may be used with an agricultural machine 12 and broadly comprises a mobile electronic device 14 and a computer server 16. The agricultural machine 12 and the mobile electronic device 14 are typically owned by, or at least in the possession of, a user who will operate the agricultural machine 12. The computer server 16 is typically owned by, or at least accessed by, an organization, such as a manufacturer, or rental company, of the agricultural machine 12, that manages a plurality of data accounts. The data accounts may be stored on the computer server 16, or on a different server, and each data account is associated with a user and may include user information, such as name and contact information, as well as operational data for one or more agricultural machines 12. Demonstrating proof of control of the agricultural machine 12 allows the operational data generated by the agricultural machine 12 to be stored in the user's data account. The system 10 may interface with a communication network 18 and an electronic device 20.

The communication network 18 allows communication between various combinations of the agricultural machine 12, the mobile electronic device 14, the electronic device 20, and the computer server 16. The communication network 18 may include local area networks, metro area networks, wide area networks, cloud networks, the Internet, telecommunications networks, public ordinary telephone service, public switched telephone network, or the like, or combinations thereof. The communication network 18 may be wired, wireless, or combinations thereof and may include components such as switches, routers, hubs, access points, and the like. The agricultural machine 12, the mobile electronic device 14, the electronic device 20, and the computer server 16 may connect to the communication network 18 either through wires, such as electrical cables or fiber optic cables, or wirelessly, such as radio frequency (RF) communication using wireless standards such as Bluetooth®, the Institute of Electrical and Electronic Engineers (IEEE) 802.11 family of protocols, or cellular protocols.

The electronic device 20 allows the user to request a process for demonstrating proof of control of the agricultural machine 12, as discussed in more detail below. The electronic device 20 may be embodied by desktop computers (such as one shown in FIG. 1), laptop computers, palmtop computers, notebook computers, tablets or tablet computers, smartphones, mobile phones, cellular phones, personal digital assistants (PDAs), or the like. The electronic device 20 is configured to execute or run a web browser which accesses information on the World Wide Web—specifically a proof of control website, hosted on the computer server 16, which executes at least a portion of the process for demonstrating proof of control of the agricultural machine 12. The proof of control website may include icons or other on-screen objects that the user can select in order to request the process for demonstrating proof of control of the agricultural machine 12. The user may also enter identification information and a password to authenticate his identity. Furthermore, the user may provide information about the agricultural machine 12.

Figure 2:
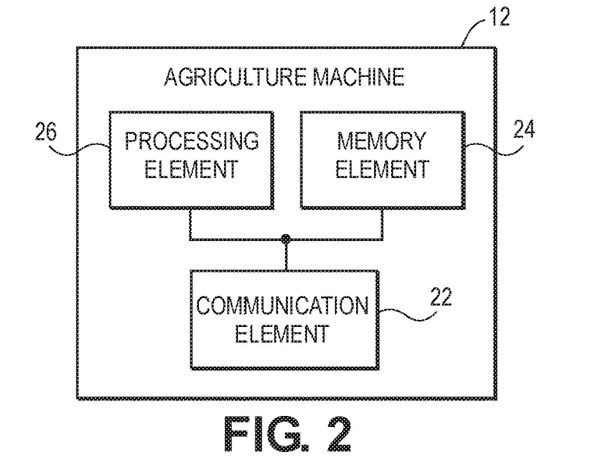
FIG. 2 is a schematic block diagram of various electronic components of the agricultural machine.

The agricultural machine 12 is a vehicle, preferably a self-propelled vehicle, such as a tractor capable of pulling or towing other pieces of agricultural equipment. The agricultural machine 12 may also be embodied by a multi-functional vehicle such as a combine harvester. The agricultural machine 12 can be used to plow, sow, plant, spread fertilizer, harvest, and so forth. The agricultural machine 12 is typically equipped with a receiver configured to receive a wireless signal from a global navigation satellite system (GNSS) such as the global positioning system (GPS) utilized in the United States from which a geolocation (e.g., latitude and longitude coordinates) of the agricultural machine 12 is determined. The agricultural machine 12 may further be equipped with sensors or other devices to measure or determine, typically through a data sampling process, the performance of the agricultural machines 12 such as speed, heading, power takeoff rotational speed, rear draft force, and the like. The agricultural machine 12 may also be able to determine operational functions such as engaging the brake, activating left or right turn signals, activating the headlights, and so forth. The agricultural machine 12 may further include one or more seat sensors which can detect the presence of a person in each seat. The agricultural machine 12 may optionally include devices such as video cameras and microphones with facial recognition and voice recognition capabilities. The agricultural machine 12 may also include a communication element 22, a memory element 24, and a processing element 26.

The communication element 22 allows the agricultural machine 12 to communicate with the mobile electronic device 14, the communication network 18, and the computer server 16. The communication element 22 may include signal and/or data transmitting and receiving circuits, such as antennas, amplifiers, filters, mixers, oscillators, digital signal processors (DSPs), and the like. The communication element 22 may establish communication wirelessly by utilizing radio frequency (RF) signals and/or data that comply with communication standards such as cellular 2G, 3G, 4G, Voice over Internet Protocol (VoIP), LTE, Voice over LTE (VoLTE), or 5G, Institute of Electrical and Electronics Engineers (IEEE) 802.11 standard such as WiFi, IEEE 802.16 standard such as WiMAX, Bluetooth™, or combinations thereof. In addition, the communication element 22 may utilize communication standards such as ANT, ANT+, Bluetooth™ low energy (BLE), the industrial, scientific, and medical (ISM) band at 2.4 gigahertz (GHz), or the like. The communication element 22 may be in electronic communication with the memory element 24 and the processing element 26.

The memory element 24 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 24 may be embedded in, or packaged in the same package as, the processing element 26. The memory element 24 may include, or may constitute, a non-transitory "computer-readable medium". The memory element 24 may store the instructions, code, code statements, code segments, software, firmware, programs, applications, apps, services, daemons, or the like that are executed by the processing element 26. The memory element 24 may also store data that is received by the processing element 26 or the device in which the processing element 26 is implemented. The processing element 26 may further store data or intermediate results generated during processing, calculations, and/or computations as well as data or final results after processing, calculations, and/or computations. In addition, the memory element 24 may store settings, data, documents, sound files, photographs, movies, images, databases, and the like.

The processing element 26 may comprise one or more processors. The processing element 26 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 26 may generally execute, process, or run instructions, code, code segments, code statements, software, firmware, programs, applications, apps, processes, services, daemons, or the like. The processing element 26 may also include hardware components such as registers, finite-state machines, sequential and combinational logic, and other electronic circuits that can perform the functions necessary for the operation of the current invention. In certain embodiments, the processing element 26 may include multiple computational components and functional blocks that are packaged separately but function as a single unit. The processing element 26 may be in electronic communication with the other electronic components through serial or parallel links that include universal busses, address busses, data busses, control lines, and the like.

The processing element 26, in combination with the communication element 22 and the memory element 24, may be operable, configured, or programmed to perform the following functions by utilizing hardware, software, firmware, or combinations thereof. The processing element 26 may receive a request, instruction, or command (sent to the agricultural machine 12) to transmit operational data related to each of the performance aspects or operational functions that the agricultural machine 12 engages in. For example, the processing element 26 may transmit, through the communication element 22, data that indicates the geolocation, speed, or heading of the vehicle, the power takeoff rotational speed or rear draft force, whether the brake, turn signals, frontside hitch, backside hitch, or headlights have been activated, whether a person is in the driver's seat, and the like. The operational data may be transmitted in near real time as the events occur or as data is sampled. Or, the operational data may be stored in the memory element 24 and transmitted at regular intervals or after an entire operation, such as plowing a field, has occurred. In addition, to the operational data, the processing element 26 may transmit a unique machine identification code which identifies the agricultural machine 12 and may include make, model, and a serial number, or the like. The machine identification code may be transmitted every time that operational data is transmitted.

Figure 3:
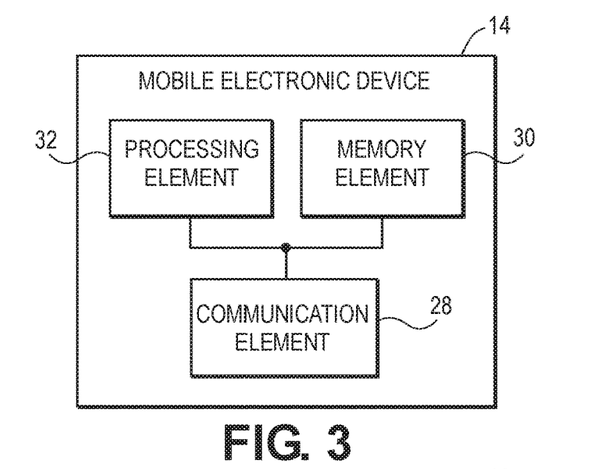
FIG. 3 is a schematic block diagram of various electronic components of the mobile electronic device.

The mobile electronic device 14 allows the user to receive an identity confirmation action sequence which includes instructions for the user to follow in order to demonstrate proof of control of the agricultural machine 12. The mobile electronic device 14 may be embodied by tablets or tablet computers, smartphones, mobile phones, cellular phones, personal digital assistants (PDAs), or the like. The mobile electronic device 14 may include a communication element 28, a memory element 30, and a processing element 32. The communication element 28, the memory element 30, and the processing element 32 are substantially similar to the communication element 22, the memory element 24, and the processing element 26, respectively.

The processing element 32, in combination with the communication element 28 and the memory element 30, may be operable, configured, or programmed to perform the following functions by utilizing hardware, software, firmware, or combinations thereof. In some embodiments, the processing element 32 may receive the identity confirmation action sequence (from the computer server 16) and display the step-by-step instructions included therein on a screen of the mobile electronic device 14 so that the user can read them. Optionally, the mobile electronic device 14 comprises a loudspeaker to output the identity confirmation action sequence as an acoustic instruction to the user so that the user can hear it.

In other embodiments, the processing element 32 may execute a web browser to access the proof of control website (on the computer server 16) in order for the user to request the demonstration of proof of control process. The proof of control website also allows the user to enter the information necessary to initiate the demonstration of proof of control process. Once the process is initiated, the processing element 32 may receive the identity confirmation action sequence (from the computer server 16) and display the step-by-step instructions included therein on a screen of the mobile electronic device 14 so that the user can read them. Alternatively, the processing element 32 may execute a proof of control mobile app, such as a smartphone or tablet app, which directly contacts the proof of control website, or a proof of control server app or program executed on the computer server 16. The proof of control mobile app may then allow the user to request and initiate the demonstration of proof of control process so that the processing element 32 can receive the identity confirmation action sequence.

In still other embodiments, the processing element 32 may execute a proof of control mobile app, somewhat similar to the one mentioned above, which directly contacts the proof of control website, or a proof of control server app or program executed on the computer server 16. While executing the proof of control mobile app, the processing element 32 may alert the computer server 16 that the processing element 32 is about to initiate the demonstration of proof of control process. The processing element 32 may also transmit the appropriate user identification, a mobile electronic device identification, and the identification of the agricultural machine 12. In addition, the processing element 32 may generate the identity confirmation action sequence, which is displayed on the screen of the mobile electronic device 14 and transmitted to the computer server 16.

Figure 4:
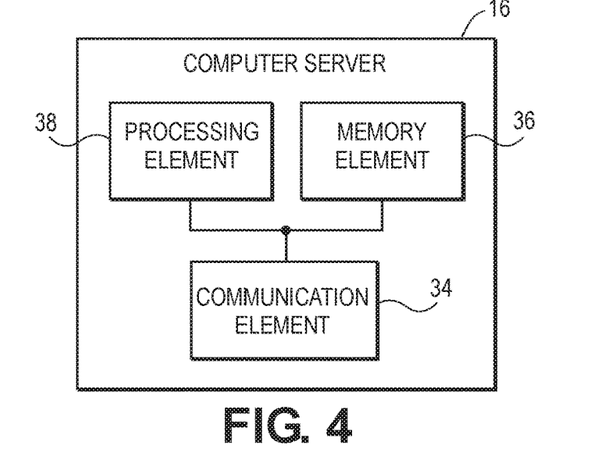
FIG. 4 is a schematic block diagram of various electronic components of the computer server.

The computer server 16 executes at least a portion of the demonstration of proof of control process. The computer server 16 may be embodied by application servers, database servers, file servers, web servers, or the like, or combinations thereof. Furthermore, the computer server 16 may include a plurality of geographically separated servers, virtual servers, or combinations thereof. The computer server 16 may also include memory storage such as optical drives, hard disk drives, rack-mount drives, blade drives, or the like, or combinations thereof. The computer server 16 may be configured to include or execute software such as file storage applications, database applications, web server applications, or the like, or combinations thereof. The computer server 16 may further include a communication element 34, a memory element 36, and a processing element 38. The communication element 34, the memory element 36, and the processing element 38 are substantially similar to the communication element 22, the memory element 24, and the processing element 26, respectively.

The processing element 38, in combination with the communication element 34 and the memory element 36, may be operable, configured, or programmed to perform the following functions by utilizing hardware, software, firmware, or combinations thereof. The processing element 38 may execute the proof of control website. The proof of control website is accessible by the user using a web browser running on the electronic device 20 or the mobile electronic device 14. While executing the proof of control website, the processing element 38 receives a request to execute the demonstration of proof of control process. The request may include user identification information, mobile electronic device identification, and identification of the agricultural machine 12. If not, then the processing element 38 may transmit a prompt to the electronic device 20 or the mobile electronic device 14 for the user to enter that information. Once in possession of the user identification information, the processing element 26 accesses a data account associated with the user. If the data account does not exist, then the processing element 38 may transmit a prompt to the electronic device 20 or the mobile electronic device 14 for the user to create one.

The processing element 38 transmits the identity confirmation action sequence to the user's mobile electronic device 14. The identity confirmation action sequence includes a series of randomly-selected or randomly-ordered operations that the user is to perform in the agricultural machine 12. The operations do not necessarily involve or include field-related operations such as seeding, plowing, harvesting, or the like. Instead, the operations include actions that can typically be performing without moving the agricultural machine 12. Operations may include sitting in the driver's seat, engaging the brake, activating the left turn signal or the right turn signal, activating the horn, activating the headlights, lifting or lowering the frontside or backside hitch, and so forth. As an example, the identity confirmation action sequence may include ten of these operations to be performed by the user in a particular sequence. The processing element 38 also transmits an instruction, signal, or command to the agricultural machine 12 to activate data logging and transmit its initial state and the operational data to the computer server 16. The processing element 38 may request a certain amount of operational data, such as the next ten actions performed in the agricultural machine 12, or the operational data for a certain time period, such as the following ten minutes.

The processing element 38 then receives operational data from the agricultural machine 12. The processing element 38 compares the received operational data with the identity confirmation action sequence. The actions indicated by the operational data, such as sitting in the driver's seat, engaging the brake, activating the headlights, etc., should match those actions in the identity confirmation action sequence. If there is a match, then the processing element 38 transmits an instruction to the agricultural machine 12 to transmit all subsequent operational data to be stored on the computer server 16 or another server in the user's data account. If the operational data does not match the identity confirmation action sequence, then the processing element 38 may transmit a message to the mobile electronic device 14 which instructs the user to try the sequence again, or the processing element 38 may transmit a new identity confirmation action sequence for the user to perform. If the operational data does not match the identity confirmation action sequence for a second time, then the processing element 38 may transmit a message to the mobile electronic device 14 alerting the user that there is a problem and he may need to verify the proper operation of the agricultural machine 12. Furthermore, if the processing element 38 does not receive the operational data from the agricultural machine 12 within a certain time period, the process may time out and the user may have to send a new request for the demonstration of proof of control process.

In addition to the demonstration of proof of control process steps discussed above, the processing element 38 may also perform additional security checks such as transmitting a request to the agricultural machine 12 to transmit its geolocation to the computer server 16. Then the processing element 38 can compare the current geolocation of the agricultural machine 12 with previous geolocation data associated with the user's data account. If the current geolocation is outside of a range of geolocations, then the processing element 38 may transmit a request to the mobile electronic device 14 for the user to verify his location.

Additionally, or alternatively, the processing element 38 may execute the proof of control server app. The proof of control website and the proof of control server app operate similarly, with the proof of control server app being accessible by the user executing the proof of control mobile app on his mobile electronic device 14. While executing the proof of control server app, the processing element 38 receives a request to execute the demonstration of proof of control process. Instead of the processing element 38 generating the identity confirmation action sequence and transmitting it to the mobile electronic device 14, the processing element 32 of the mobile electronic device 14 generates the identity confirmation action sequence and transmits it to the computer server 16. The rest of the process is the same as described above, with the processing element 38 instructing the agricultural machine 12 to transmit operational data to the computer server 16 and verifying the operational data matches the identity confirmation action sequence.

Figure 7:
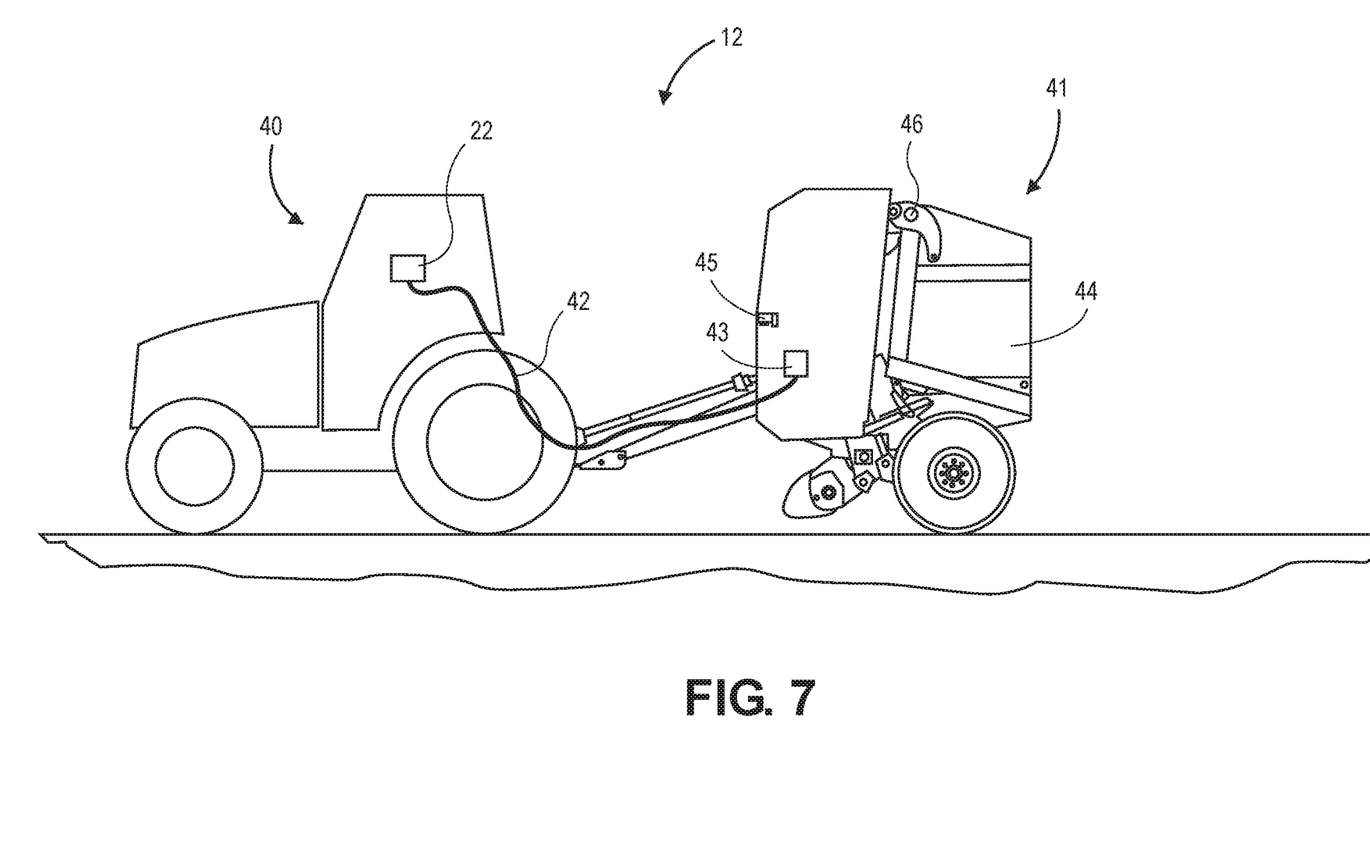
FIG. 7 is an environmental view of an alternative embodiment of the agricultural machine.

The demonstration of proof of control process can also be performed for other pieces of agricultural equipment connected to the agricultural machine 12 through a communications port. As shown in FIG. 7, the agricultural machine 12 may include a combination of an agricultural vehicle 40 such as a tractor and an agricultural implement 41 such as a baler. The agricultural implement 41 can be mechanically linked to the agricultural vehicle 40 and towed by it. The agricultural implement 41 comprises a control unit 43. The control unit 43 controls several functions of the agricultural implement 41. In the exemplary case of a baler, the control unit 43 can control the complete baling process from picking up of the swath from the field to opening or closing a rear door 44 of the baler for putting out the finished bale. In addition, communication signals can be transmitted between the communication element 22 located in the agricultural vehicle 40 and the control unit 43 of the agricultural implement 41 via a wired connection 42. Alternatively, the communication element 22 and the control unit 43 can communicate wirelessly. This configuration enables the functionality of the agricultural vehicle 40 as well as the functionality of the agricultural implement 41 to be included in the demonstration of proof of control process. In addition to the above-described operations the identity confirmation action sequence can include a series of randomly-selected or randomly-ordered operations that the user is to perform with the agricultural implement 41 alone or in combination with the agricultural vehicle 40 and the agricultural implement 41. Thus, in the case of a baler, the operations may additionally include open or closing of the rear door 44 of the baler besides sitting in the driver's seat, engaging the brake, activating the left turn signal or the right turn signal, activating the horn, activating the headlights, lifting or lowering the frontside or backside hitch and so forth. The user can be prompted to operate the agricultural implement 41 inside the agricultural vehicle 40 or outside the agricultural vehicle 40. Both alternatives can be distinguished by the agricultural machine 12. In case of the first alternative (activation inside the agricultural vehicle 40), the user operates an activation switch of the terminal of the agricultural vehicle 40. The activation command is sent to the agricultural implement 41 via the cable connection 42 to the control unit 43. In reaction the rear door 44 will be activated. A sensor 46 detects the opened or closed status of the rear door 44 of the baler 41. The status of the rear door 44 is sent back to the communication element 22 via the control unit 43. In case of the second alternative (activation outside the agricultural vehicle 40), the user needs to operate an activation switch 45 located on the agricultural implement 41, e.g. the baler. After operation of the activation switch 45, a confirmation signal of the activation and the sensor signal of the sensor 46 are sent to the communication element 22. These signals are used for the generation of the operational data indicating the operation outside of the agricultural vehicle 40. After receipt of the signals, the operational data is transferred to the computer server 16. The processing element 38 of the computer server 16 receives the operational data related to the identity confirmation action sequence from the agricultural vehicle 40 as well as from the agricultural implement 41 composing the agricultural machine 12. Then, the processing element 32 compares the operational data with the identity confirmation action sequence.

The choice of the number of actions included in the identity confirmation action sequence and the amount of time in which the operational data (including the actions) is received may determine a probability that the actions could be guessed by someone attempting to impersonate the user. The following equations may be used to derive the probability.

$$A = \{A_1, A_2, \ldots, A_k\} \qquad \text{EQ. 1}$$

Wherein A is a set of k possible actions.

$$Q = [A_1, A_2, \ldots, A_n] \qquad \text{EQ. 2}$$

Wherein Q is a sequence of n elements from A.

$$K = k^n \qquad \text{EQ. 3}$$

Wherein K is a number of combinations.

$$m \leq \frac{n \cdot t}{T} \qquad \text{EQ. 4}$$

Wherein m is a number of tries, t is a minimal action time period, and T is an authentication time frame.

$$p = \frac{m}{K} \approx \frac{n \cdot t}{k^n \cdot T} \qquad \text{EQ. 5}$$

Wherein p is a probability to guess Q in time T.

The system 10 may operate as follows. The user transmits a request to the computer server 16 for a demonstration of proof of control process in order to have the operational data generated by the agricultural machine 12 to be stored in a data account associated with the user. In some embodiments, the request is made using an electronic device 20 or a mobile electronic device 14 which executes a web browser to access a proof of control website hosted on the computer server 16. In other embodiments, the request may be made using a proof of control mobile app executed on the user's mobile electronic device 14.

In some embodiments, the computer server 16 receives the request and generates an identity confirmation action sequence which the computer server 16 transmits to the mobile electronic device 14 of the user. In other embodiments, the mobile electronic device 14 generates the identity confirmation action sequence and transmits it to the computer server 16. In all embodiments, the mobile electronic device 14 displays the identity confirmation action sequence on its screen for the user to read. The user then performs the actions listed in the identity confirmation action sequence in the agricultural machine 12.

The agricultural machine 12 transmits operational data related to the actions performed by the user. The operational data is received by the computer server 16 which compares actions indicated by the operational data with the identity confirmation action sequence. If there is a match, then the computer server 16 transmits an instruction to the agricultural machine 12 to transmit all subsequent operational data to be stored on the computer server 16 or another server in the user's data account. If there is not a match, then the computer server 16 may transmit a message to the mobile electronic device 14 which instructs the user to try the sequence again, or the computer server 16 may transmit a new identity confirmation action sequence for the user to perform. If the operational data does not match the identity confirmation action sequence for a second time, then the computer server 16 may transmit a message to the mobile electronic device 14 alerting the user that there is a problem and he may need to verify the proper operation of the agricultural machine 12. Furthermore, if the computer server 16 does not receive the operational data from the agricultural machine 12 within a certain time period, the process may time out and the user may have to send a new request for the demonstration of proof of control process.

Figure 5:
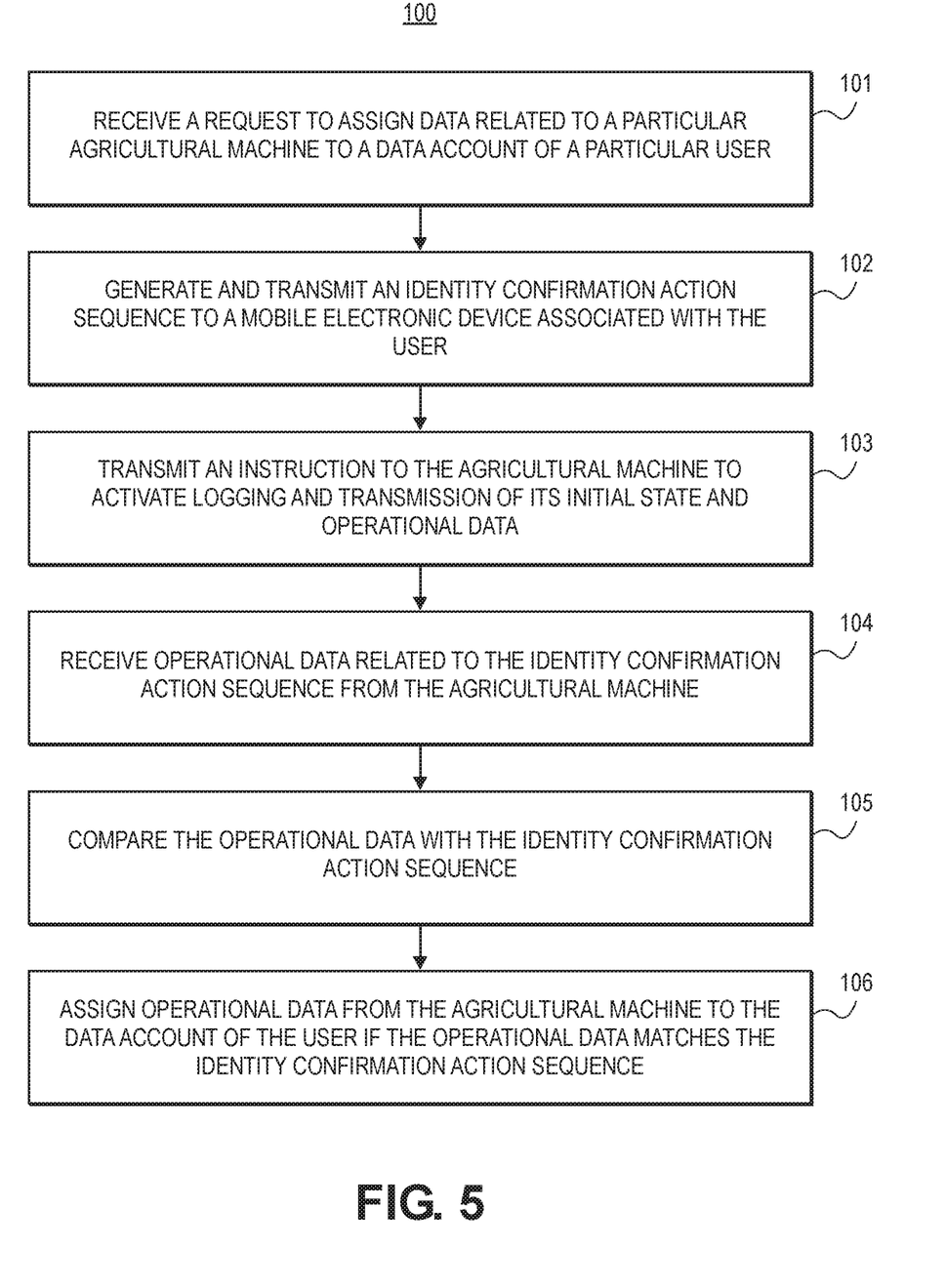
FIG. 5 is a listing of at least a portion of a method for demonstrating proof of control of an agricultural machine.

FIG. 5 depicts a listing of at least a portion of the steps of an exemplary computer-implemented method 100 for demonstrating proof of control of an agricultural machine. The steps may be performed in the order shown in FIG. 5, or they may be performed in a different order. Furthermore, some steps may be performed concurrently as opposed to sequentially. In addition, some steps may be optional or may not be performed. The steps may be performed or executed by the processing element 38 of the computer server 16.

Referring to step 101, a request for a demonstration of proof of control process is received. The request is made by a user who owns and/or operates an agricultural machine 12. The user wants to have the operational data generated by the agricultural machine 12 to be stored in a data account associated with the user. The request is made using an electronic device 20 or a mobile electronic device 14 which executes a web browser to access a proof of control website hosted on the computer server 16.

Referring to step 102, an identity confirmation action sequence is generated and transmitted to the mobile electronic device 14 associated with the user. The identity confirmation action sequence is generated by the computer server 16 and includes a series of randomly-selected or randomly-ordered operations that the user is to perform in the agricultural machine 12. The operations do not necessarily involve or include field-related operations such as seeding, plowing, harvesting, or the like. Instead, the operations include actions that can typically be performing without moving the agricultural machine 12. Operations may include sitting in the driver's seat, engaging the brake, activating the left turn signal or the right turn signal, activating the horn, activating the headlights, lowering or rising a frontside or backside hitch, and so forth. As an example, the identity confirmation action sequence may include ten of these operations to be performed by the user in a particular sequence.

Referring to step 103, a signal is transmitted to the agricultural machine 12 to activate data logging and transmission of its initial state and the operational data to the computer server 16. The agricultural machine 12 may also be instructed to transmit a certain amount of operational data, such as the next ten actions performed in the agricultural machine 12, or the operational data for a certain time period, such as the following ten minutes.

Referring to step 104, the operational data related to the identity confirmation action sequence is received from the agricultural machine 12. The operational data is generated as the user performs the actions of the identity confirmation action sequence in the agricultural machine 12 and the agricultural machine 12 transmits the data.

Referring to step 105, the operational data is compared with the identity confirmation action sequence. The actions indicated by the operational data, such as sitting in the driver's seat, engaging the brake, activating the headlights, etc., should match those actions in the identity confirmation action sequence.

Referring to step 106, operational data from the agricultural machine 12 is assigned to the data account of the user if the operational data matches the identity confirmation action sequence. An instruction is transmitted to the agricultural machine 12 to transmit all subsequent operational data to be stored on the computer server 16 or another server in the user's data account.

If the operational data does not match the identity confirmation action sequence, then a message is transmitted to the mobile electronic device 14 which instructs the user to try the sequence again, or a new identity confirmation action sequence is transmitted to the mobile electronic device 14 for the user to perform. If the operational data does not match the identity confirmation action sequence for a second time, then a message may be transmitted to the mobile electronic device 14 alerting the user that there is a problem and he may need to verify the proper operation of the agricultural machine 12. Furthermore, if the operational data is not received from the agricultural machine 12 within a certain time period, the process may time out and the user may have to send a new request for the demonstration of proof of control process.

Figure 6:
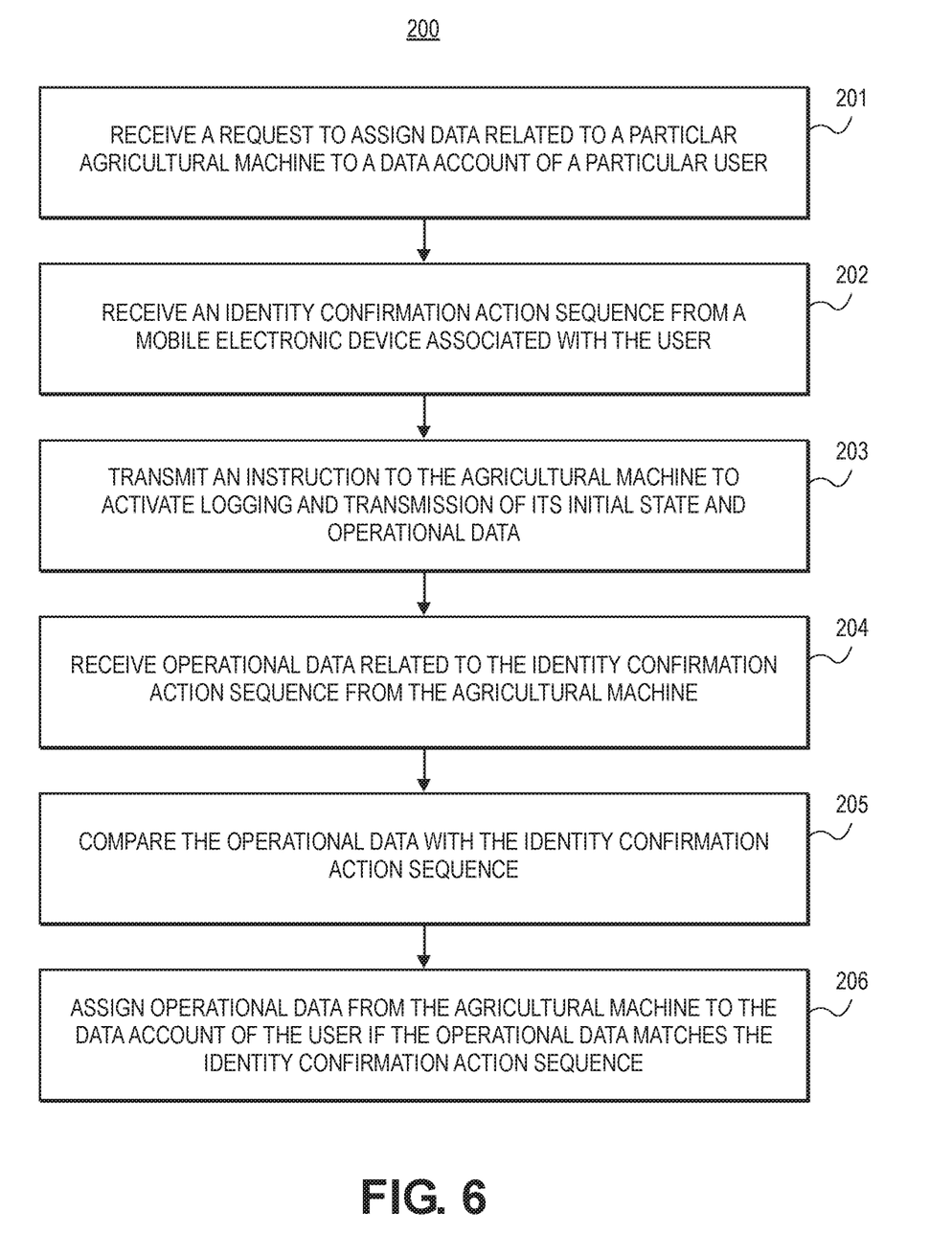
FIG. 6 is a listing of at least a portion of another method for demonstrating proof of control of an agricultural machine.

FIG. 6 depicts a listing of at least a portion of the steps of another computer-implemented method 200 for demonstrating proof of control of an agricultural machine. The steps may be performed in the order shown in FIG. 6, or they may be performed in a different order. Furthermore, some steps may be performed concurrently as opposed to sequentially. In addition, some steps may be optional or may not be performed. The steps may be performed or executed by the processing element 38 of the computer server 16.

Referring to step 201, a request for a demonstration of proof of control process is received. The request is made by a user who owns and/or operates an agricultural machine 12. The user wants to have the operational data generated by the agricultural machine 12 to be stored in a data account associated with the user. The request is made using an electronic device 20 or a mobile electronic device 14 which executes a web browser to access a proof of control website hosted on the computer server 16.

Referring to step 202, an identity confirmation action sequence is received from the mobile electronic device 14 associated with the user. The identity confirmation action sequence is generated by the mobile electronic device 14 and includes a series of randomly-selected or randomly-ordered operations that the user is to perform in the agricultural machine 12. The operations do not necessarily involve or include field-related operations such as seeding, plowing, harvesting, or the like. Instead, the operations include actions that can typically be performing without moving the agricultural machine 12. Operations may include sitting in the driver's seat, engaging the brake, activating the left turn signal or the right turn signal, activating the horn, activating the headlights, and so forth. As an example, the identity confirmation action sequence may include ten of these operations to be performed by the user in a particular sequence.

Referring to step 203, a signal is transmitted to the agricultural machine 12 to activate data logging and transmission of its initial state and the operational data to the computer server 16. The agricultural machine 12 may also be instructed to transmit a certain amount of operational data, such as the next ten actions performed in the agricultural machine 12, or the operational data for a certain time period, such as the following ten minutes.

Referring to step 204, the operational data related to the identity confirmation action sequence is received from the agricultural machine 12. The operational data is generated as the user performs the actions of the identity confirmation action sequence in the agricultural machine 12 and the agricultural machine 12 transmits the data.

Referring to step 205, the operational data is compared with the identity confirmation action sequence. The actions indicated by the operational data, such as sitting in the driver's seat, engaging the brake, activating the headlights, lowering or raising a frontside or backside hitch, etc., should match those actions in the identity confirmation action sequence.

Referring to step 206, operational data from the agricultural machine 12 is assigned to the data account of the user if the operational data matches the identity confirmation action sequence. An instruction is transmitted to the agricultural machine 12 to transmit all subsequent operational data to be stored on the computer server 16 or another server in the user's data account.

If the operational data does not match the identity confirmation action sequence, then a message is transmitted to the mobile electronic device 14 which instructs the user to try the sequence again, or a new identity confirmation action sequence is transmitted to the mobile electronic device 14 for the user to perform. If the operational data does not match the identity confirmation action sequence for a second time, then a message may be transmitted to the mobile electronic device 14 alerting the user that there is a problem and he may need to verify the proper operation of the agricultural machine 12. Furthermore, if the operational data is not received from the agricultural machine 12 within a certain time period, the process may time out and the user may have to send a new request for the demonstration of proof of control process.

Additional Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A system for demonstrating proof of control of an agricultural machine by a user, the agricultural machine configured to generate and transmit operational data corresponding to operations performed by the agricultural machine, the system comprising:
   a mobile electronic device configured to receive an identity confirmation action sequence for the user to perform in the agricultural machine; and
   a computer server including a processing element in electronic communication with a memory element, the processing element configured or programmed to:
      receive a request to execute a demonstration of proof of control process,
      generate and transmit instructions to the mobile electronic device, the instructions describing an identity confirmation action sequence,
      transmit an instruction to the agricultural machine to activate logging and transmission of its initial state and operational data,
      receive operational data related to the identity confirmation action sequence from the agricultural machine,
      compare the operational data with the instructions transmitted to the mobile electronic device describing the identity confirmation action sequence, and
      transmit a message to the mobile electronic device that instructs the user to perform the identity confirmation action sequence again if the operational data does not match the instructions transmitted to the mobile electronic device describing the identity confirmation action sequence.

2. The system of claim 1, wherein the processing element is further configured or programmed to assign operational data from the agricultural machine to a data account of the user if the operational data matches the identity confirmation action sequence.

3. The system of claim 1, wherein the identity confirmation action sequence includes a plurality of randomly-selected or randomly-ordered actions to be performed in the agricultural machine.

4. The system of claim 1, wherein the agricultural machine comprises a combination of an agricultural vehicle and an agricultural implement and wherein the operational data comprises data from the agricultural implement.

5. The system of claim 4, wherein the operational data comprises data indicating an operation outside of the agricultural vehicle.

* * * * *